(12) United States Patent
Zheng et al.

(10) Patent No.: US 12,085,232 B1
(45) Date of Patent: Sep. 10, 2024

(54) HYDROGEN REFUELING STATIONS BASED ON LOW-TEMPERATURE AND HIGH-PRESSURE GRADED HYDROGEN STORAGE AND GASEOUS HYDROGEN REFUELING METHODS THEREOF

(71) Applicant: Zhejiang University, Hangzhou (CN)

(72) Inventors: Jinyang Zheng, Hangzhou (CN); Yehong Yu, Hangzhou (CN); Zhengli Hua, Hangzhou (CN); Chaohua Gu, Hangzhou (CN); Sheng Ye, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/598,845

(22) Filed: Mar. 7, 2024

Related U.S. Application Data

(63) Continuation of application No. PCT/CN2023/138538, filed on Dec. 13, 2023.

(30) Foreign Application Priority Data

Jun. 29, 2023 (CN) .......................... 202310777900.6

(51) Int. Cl.
*F17C 5/00* (2006.01)
*F17C 5/02* (2006.01)

(52) U.S. Cl.
CPC ................ *F17C 5/007* (2013.01); *F17C 5/02* (2013.01); *F17C 2201/0109* (2013.01);
(Continued)

(58) Field of Classification Search
CPC .... F17C 5/007; F17C 5/02; F17C 2201/0109; F17C 2203/012; F17C 2203/0391;
(Continued)

(56) References Cited

U.S. PATENT DOCUMENTS 10,240,721 B2 * 3/2019 Dawson .................... F17C 5/06
10,533,708 B2 * 1/2020 Okuno ...................... F17C 5/06
(Continued)

FOREIGN PATENT DOCUMENTS

CN 108916643 A 11/2018
CN 208074568 U 11/2018
(Continued)

OTHER PUBLICATIONS

State Intellectual Property Office of the People's Republic of China, Office Action and Search Report Issued in Application No. 2023107779006, Aug. 8, 2023, 19 pages.(Submitted with Machine/Partial Translation).
(Continued)

*Primary Examiner* — Frederick C Nicolas
(74) *Attorney, Agent, or Firm* — Volpe Koenig

(57) ABSTRACT

A hydrogen refueling station based on low-temperature and high-pressure graded hydrogen storage includes: a liquid hydrogen storage tank, n≥2 hydrogen storage vessels that are low-temperature and high-pressure vessels, a booster pump and a high-pressure vaporizer, disposed between the storage tank and the storage vessels. A temperature value and a maximum pressure value of gaseous hydrogen stored in the storage vessels are $T_n$ and $P_n$; when n=2, $T_1<T_2$, $P_1<P_2$; and when n≥3, $T_1< \ldots T_{(n-1)}<T_n$, $P_1< \ldots P_{(n-1)}<P_n$. A main refueling pipe is configured to communicate the hydrogen storage vessels with the hydrogen dispenser. A refueling controller is configured to, based on an ascending order of the temperature values, sequentially control corresponding hydrogen storage vessels to communicate with the hydrogen dispenser for participation in a refueling operation. A gaseous hydrogen refueling method based on the hydrogen refueling station is further provided.

19 Claims, 2 Drawing Sheets

(52) U.S. Cl.
CPC   *F17C 2203/012* (2013.01); *F17C 2203/0391* (2013.01); *F17C 2203/0624* (2013.01); *F17C 2203/0656* (2013.01); *F17C 2205/0134* (2013.01); *F17C 2205/0311* (2013.01); *F17C 2205/0352* (2013.01); *F17C 2221/012* (2013.01); *F17C 2223/013* (2013.01); *F17C 2223/036* (2013.01); *F17C 2227/0135* (2013.01); *F17C 2227/0304* (2013.01); *F17C 2250/043* (2013.01); *F17C 2250/0439* (2013.01); *F17C 2250/0636* (2013.01); *F17C 2265/065* (2013.01)

(58) Field of Classification Search
CPC ...... F17C 2203/0624; F17C 2203/0656; F17C 2205/0134; F17C 2205/0311; F17C 2205/0352; F17C 2221/012; F17C 2223/013; F17C 2223/036; F17C 2227/0135; F17C 2227/0304; F17C 2250/043; F17C 2250/0439; F17C 2250/0636; F17C 2265/065
See application file for complete search history.

(56)   References Cited

U.S. PATENT DOCUMENTS

| | | | |
|---|---|---|---|
| 11,608,938 B2* | 3/2023 | Ku | C25B 1/04 |
| 2016/0265720 A1 | 9/2016 | Okuno et al. | |
| 2021/0207970 A1 | 7/2021 | Asai et al. | |

FOREIGN PATENT DOCUMENTS

| | | |
|---|---|---|
| CN | 112483886 A | 3/2021 |
| CN | 113375040 A | 9/2021 |
| CN | 216143551 U | 3/2022 |
| CN | 114576553 A | 6/2022 |
| CN | 114992507 A | 9/2022 |
| CN | 115355440 A | 11/2022 |
| CN | 217736920 U | 11/2022 |
| CN | 115596991 A | 1/2023 |
| CN | 219013995 U | 5/2023 |
| CN | 116518298 A | 8/2023 |
| JP | 2011-089620 A | 5/2011 |
| JP | 2020-063800 A | 4/2020 |
| WO | 2022/135109 A1 | 6/2022 |

OTHER PUBLICATIONS

State Intellectual Property Office of the People's Republic of China, Notice of Allowance Issued in Application No. 2023107779006 , Sep. 12, 2023, 6 pages.(Submitted with Machine/Partial Translation).

ISA State Intellectual Property Office of the People's Republic of China, International Search Report Issued in Application No. PCT/CN2023/138538, Mar. 20, 2024, WIPO, 10 pages.

ISA State Intellectual Property Office of the People's Republic of China, Written Opinion of the International Searching PCT/CN2023/138538, Mar. 20, 2024, WIPO, 10 pages.

* cited by examiner

HYDROGEN REFUELING STATIONS BASED ON LOW-TEMPERATURE AND HIGH-PRESSURE GRADED HYDROGEN STORAGE AND GASEOUS HYDROGEN REFUELING METHODS THEREOF

CROSS-REFERENCE TO RELATED APPLICATIONS

This application is a continuation application of International PCT Application No. PCT/CN2023/138538 filed on Dec. 13, 2023, which claims priority to Chinese patent application No. 202310777900.6 filed on Jun. 29, 2023, the entire contents of which are incorporated herein by reference.

TECHNICAL FIELD

The present disclosure relates to the field of hydrogen energy and in particular to a hydrogen refueling station based on low-temperature and high-pressure graded hydrogen storage and a gaseous hydrogen refueling method thereof.

BACKGROUND

Hydrogen refueling station is a site specially designed to fill hydrogen fuel into the hydrogen storage cylinders of hydrogen energy vehicles as well as one of infrastructures necessary for commercialized development of hydrogen energy vehicles. At present, the off-site hydrogen production type hydrogen refueling stations are mainly divided into high-pressure gaseous hydrogen storage and transportation type hydrogen refueling stations and low-temperature liquid hydrogen storage and transportation type hydrogen refueling stations based on in-transportation hydrogen state. The refueling pressure level of the high-pressure gaseous hydrogen storage and transportation type hydrogen refueling stations mainly includes 35 MPa and 70 MPa, and related technologies are relatively mature. Under the condition of 293 K and 70 MPa, the density of the gaseous hydrogen is 39.706 kg/m$^3$. Nowadays, the refueling pressure level of most hydrogen refueling stations in China is 35 MPa. For the low-temperature liquid hydrogen storage and transportation type hydrogen refueling stations, liquid hydrogen produced off site is transported to the hydrogen refueling stations by liquid hydrogen tank trucks and stored in the on-site liquid hydrogen storage tanks.

SUMMARY

The present disclosure provides a hydrogen refueling station based on low-temperature and high-pressure graded hydrogen storage, and a gaseous hydrogen refueling method thereof.

An embodiment of the present disclosure provides a hydrogen refueling station based on low-temperature and high-pressure graded hydrogen storage, including: a liquid hydrogen storage tank; hydrogen storage vessels, where a number of the hydrogen storage vessels is n, n≥2, and the hydrogen storage vessels are low-temperature and high-pressure hydrogen storage vessels; a booster pump and a high-pressure vaporizer, disposed between the liquid hydrogen storage tank and the hydrogen storage vessels, where the booster pump is configured to pressurize low-temperature and low-pressure liquid hydrogen output by the liquid hydrogen storage tank into low-temperature and high-pressure liquid hydrogen, and the high-pressure vaporizer is configured to vaporize the low-temperature and high-pressure liquid hydrogen output by the booster pump into low-temperature and high-pressure gaseous hydrogen, adjust a temperature of the low-temperature and high-pressure gaseous hydrogen to a set temperature, and store the low-temperature and high-pressure gaseous hydrogen into the hydrogen storage vessels; where a temperature value and a maximum pressure value of the low-temperature and high-pressure gaseous hydrogen stored in the hydrogen storage vessels are $T_n$ and $P_n$; when n=2, $T_1<T_2$, $P_1<P_2$; when n≥3, $T_1< \ldots T_{(n-1)}<T_n$ and $P_1< \ldots P_{(n-1)}<P_n$; a hydrogen dispenser, and a main refueling pipe, configured to communicate the hydrogen storage vessels with the hydrogen dispenser and provided with a refueling controller; where the refueling controller is configured to, based on an ascending order of the temperature values, sequentially control corresponding hydrogen storage vessels to communicate with the hydrogen dispenser for participation in a refueling operation.

In some embodiments, $-60°$ C.$\leq T_n \leq -45°$ C., 40 MPa$\leq P_n \leq$95 MPa.

In some embodiments, n=3, $-60°$ C.$\leq T_1 <-55°$ C., $-55°$ C.$\leq T_2 <-50°$ C., $-50°$ C.$\leq T_3 \leq -45°$ C.; and 40 MPa$\leq P_1 <$50 MPa, 60 MPa$\leq P_2 <$70 MPa, 80 MPa$\leq P_3 \leq$95 MPa.

In some embodiments, when a design pressure of a hydrogen storage vessel is 45 MPa to 50 MPa, a design volume of the hydrogen storage vessel is between 5 m$^3$ and 8 m$^3$.

In some embodiments, when the design pressure of the hydrogen storage vessel is above 65 MPa, the design volume of the hydrogen storage vessel is between 3 m$^3$ and 5 m$^3$.

In some embodiments, the hydrogen storage vessel includes: an inner cylinder; and a ribbon wound layer, formed by winding a steel ribbon on an outer surface of the inner cylinder in an interlaced manner.

In some embodiments, the hydrogen storage vessel further includes: a protective housing, sleeved outside the inner cylinder and the ribbon wound layer; and a reinforcing hoop, fixed to the ribbon wound layer.

In some embodiments, the hydrogen storage vessel further includes a head, and the head includes: an inner head, fixed to an end portion of the ribbon wound layer and the inner cylinder; and an outer head, fixed to an end portion of the ribbon wound layer and the reinforcing hoop.

In some embodiments, the hydrogen storage vessel further includes a heat insulating layer disposed outside the protective housing and the head.

In some embodiments, the hydrogen storage vessel is internally provided with an electric heating assembly, and the electric heating assembly includes a heat exchange tube and an electric heating wire disposed inside the heat exchange tube.

In some embodiments, the heat exchange tube is positioned on an inner wall of the inner cylinder, and both ends of the electric heating wire are provided with a lead wire protruding out of the hydrogen storage vessel.

In some embodiments, a heat conduction medium is filled between an inner wall of the heat exchange tube and the electric heating wire.

In some embodiments, based on an order of pressure values of the low-temperature and high-pressure gaseous hydrogen stored internally, two of the hydrogen storage vessels adjacent to each other in sequence are a first high-pressure tank and a second high-pressure tank, and a pressure value of the low-temperature and high-pressure gaseous hydrogen stored in the first high-pressure tank is less than a pressure value of the low-temperature and high-pressure gaseous hydrogen stored in the second high-pressure tank.

In some embodiments, the main refueling pipe includes: a first refueling pipe, located between the hydrogen storage vessels and the refueling controller; and a header pipe, located between the refueling controller and the hydrogen dispenser.

In some embodiments, a second refueling pipe is disposed between the first high-pressure tank and the second high-pressure tank, and is in communication with the refueling controller; and the refueling controller is configured to control the hydrogen storage vessels to select the first refueling pipe or the second refueling pipe to communicate with the header pipe.

In some embodiments, the second refueling pipe is provided with an ejector; the ejector includes an ejection fluid inlet in communication with the first high-pressure tank, a working fluid inlet in communication with the second high-pressure tank, and an ejection mouth in communication with the refueling controller, such that the low-temperature and high-pressure gaseous hydrogen output by the second high-pressure tank drives the low-temperature and high-pressure gaseous hydrogen output by the first high-pressure tank so as to be ejected together out of the ejection mouth.

In some embodiments, the hydrogen dispenser is provided with a high-voltage electric heater configured to heat the low-temperature and high-pressure gaseous hydrogen flowing into the hydrogen dispenser.

Furthermore, an embodiment of the present disclosure further provides a gaseous hydrogen refueling method, applied to the hydrogen refueling station based on low-temperature and high-pressure graded hydrogen storage in any one of the above embodiments to refuel gaseous hydrogen into an onboard hydrogen storage cylinder. The gaseous hydrogen refueling method includes following steps:

at step S100, by using the refueling controller, controlling a hydrogen storage vessel storing the gaseous hydrogen with the temperature value $T_1$ and the maximum pressure value $P_1$ to communicate with the hydrogen dispenser to perform pre-cooling on the main refueling pipe and a subsequent pipe and perform refueling;

at step S200, in response to determining that an internal pressure value of the hydrogen storage vessel storing the gaseous hydrogen with the temperature value $T_1$ and the maximum pressure value $P_1$ drops to be less than a sum of a back pressure of the hydrogen dispenser and a set switching pressure difference, controlling a next hydrogen storage vessel based on the ascending order of the temperature values to communicate with the hydrogen dispenser for refueling; and at step S300, using other hydrogen storage vessels as in the step S200 until the refueling is completed or the internal pressure value of all hydrogen storage vessels drops to be less than the sum of the back pressure of the hydrogen dispenser and the set switching pressure difference.

Furthermore, an embodiment of the present disclosure further provides a gaseous hydrogen refueling method, applied to the hydrogen refueling station based on low-temperature and high-pressure graded hydrogen storage in the above embodiments to perform hydrogen refueling on an onboard hydrogen storage cylinder, where the gaseous hydrogen refueling method includes following steps:

at step S400, by using the refueling controller, controlling a hydrogen storage vessel storing the gaseous hydrogen with the temperature value $T_1$ and the maximum pressure value $P_1$ to select the first refueling pipe to communicate with the header pipe for refueling, so as to perform pre-cooling on the main refueling pipe and a subsequent pipe and perform refueling;

at step S500, in response to determining that an internal pressure value of the hydrogen storage vessel storing the gaseous hydrogen with the temperature value $T_1$ and the maximum pressure value $P_1$ drops to be less than a sum of a back pressure of the hydrogen dispenser and a set switching pressure difference, controlling, by using the refueling controller, the hydrogen storage vessel storing the gaseous hydrogen with the temperature value $T_1$ and the maximum pressure value $P_1$ and a hydrogen storage vessel storing the gaseous hydrogen with the temperature value $T_2$ and the maximum pressure value $P_2$ to select the second refueling pipe to communicate with the header pipe for refueling, so as to increase a gaseous hydrogen use rate of the hydrogen storage vessel storing the gaseous hydrogen with the temperature value $T_1$ and the maximum pressure value $P_1$;

at step S600, in response to determining that a the pressure value of the ejection mouth is less than the sum of the back pressure of the hydrogen dispenser and the set switching pressure difference, controlling, by the refueling controller, the hydrogen storage vessel storing the gaseous hydrogen with the temperature value $T_2$ and the maximum pressure value $P_2$ to select the first refueling pipe to communicate with the header pipe for refueling; and at step S700, using other hydrogen storage vessels as in the steps S500 and S600 until the refueling is completed or the internal pressure value of all hydrogen storage vessels drops to be less than the sum of the back pressure of the hydrogen dispenser and the set switching pressure difference.

The characteristics and advantages of the present disclosure will be detailed below with the specific embodiments and the accompanying drawings. The best implementations or means of the present disclosure will be exhausted in combination with the drawings but do not constitute any limitation to the technical solutions of the present disclosure. Furthermore, multiple features, elements or components are shown in the following descriptions and drawings and for ease of descriptions, marked with different symbols or numerals which refer to the components with same or similar constructs or functions.

BRIEF DESCRIPTION OF DRAWINGS

The present disclosure will be further described below in combination with drawings.

Figure 1:
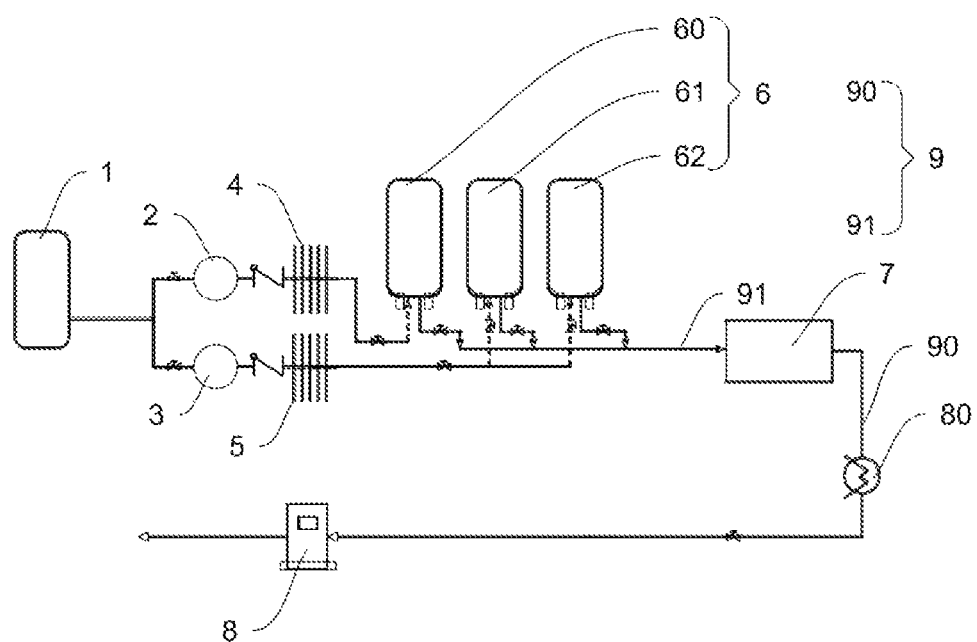
FIG. 1 is a schematic diagram illustrating a hydrogen refueling station based on low-temperature and high-pressure graded hydrogen storage according to an embodiment of the present disclosure.

Numerals of the drawings are described below: 1. liquid hydrogen storage tank, 2. first booster pump, 3. second booster pump, 4. first high-pressure vaporizer, 5. second high-pressure vaporizer, 6. hydrogen storage vessel, 60. first hydrogen storage vessel, 61. second hydrogen storage vessel, 62. third hydrogen storage vessel, 63. inner cylinder, 64. ribbon wound layer, 65. protective housing, 66. head, 660. inner head, 661. outer head, 662. head seat, 663. reinforcing hoop, 67. heat insulating layer, 670. sensor interface, 68. electric heating assembly, 680. heat exchange tube, 681. electric heating wire, 6811. lead wire, 682. heat conduction medium, 69. saddle support, 7. refueling controller, 8. hydrogen dispenser, 80. high-voltage electric heater, 9. main refueling pipe, 90. header pipe, 91. first refueling pipe, 10. second refueling pipe, 100. first ejector, and 101. second ejector.

DETAILED DESCRIPTION

The embodiments of the present disclosure will be set forth in details below with examples illustrated in the drawings, where same or similar numerals represent same or similar elements or elements with same or similar function throughout. The embodiments based on the implementations of the present disclosure are intended to interpret the present disclosure and shall not be understood as limiting of the present disclosure.

"One embodiment" or "instance" or "example" referred to in the specification is intended to refer to that the specific features, structures or characteristics described in combination with the embodiments themselves may be included in at least one embodiment of the present disclosure. The phrase "in one embodiment" appearing in each position of the specification does not necessarily refer to a same embodiment.

To increase the endurance of the vehicles, the hydrogen energy passenger vehicles and commercial vehicles (e.g. bus or heavy-duty truck or the like) all develop toward the pressure level of 70 MPa. In the related arts, the hydrogen storage capacity of the hydrogen energy buses and the heavy-duty trucks can reach 30 to 40 kg. Along with rapid development of the hydrogen energy vehicle market, higher requirements are imposed on the daily refueling capability and the hydrogen refueling costs of the hydrogen refueling stations. But, since the hydrogen transportation mode of the long-tube trailers is limited by the transportation distance and the on-site fixed hydrogen storage capacity is also relatively limited, the daily hydrogen refueling capability of the hydrogen refueling stations is directly affected. Furthermore, the equipments such as hydrogen compressor or cooling equipment or the like require high energy consumption and high maintenance cost for normal operation, leading to high operation costs.

The density of the saturated liquid hydrogen is about 70.848 kg/m$^3$, which is about 1.78 times the hydrogen density under 293 K and 70 Mpa. Moreover, in a same occupation space, higher hydrogen storage capacity can be achieved on site by using liquid hydrogen storage than by using the high-pressure hydrogen storage, so as to effectively increase the daily refueling capability of the hydrogen refueling stations. In the current mainstream refueling method of the low-temperature liquid hydrogen storage and transportation type hydrogen refueling stations, a thermal management method of firstly converting low-temperature hydrogen into ambient-temperature hydrogen and then cooling the ambient-temperature hydrogen by pre-cooling is employed. This refueling method wastes cold energy carried by the liquid hydrogen itself and subsequently obtains cold energy for the gaseous hydrogen by energy consumption, and therefore a noticeable energy waste occurs, affecting the entire economic improvement of the liquid hydrogen type hydrogen refueling stations.

To solve the technical problem, the following method is generally used: a part of liquid hydrogen is firstly converted into ambient-temperature gaseous hydrogen by the current method, and then the ambient-temperature gaseous hydrogen is pre-cooled using cold energy carried by the other part of the liquid hydrogen, eliminating use of a pre-cooling device for pre-cooling the gaseous hydrogen before refueling, saving the costs and reducing the wastes of the cold energy of the liquid hydrogen. In the above solution, although replacing the pre-cooling effect of the pre-cooling device by using partial cold energy of the liquid hydrogen can save, to some extent, the cost and energy consumption of the pre-cooling device, the disposal of a liquid hydrogen circulating unit also requires an amount of cost. More importantly, this method can only use a small amount of cold energy of the liquid hydrogen, wasting a large amount of cold energy.

An embodiment of the present disclosure provides a hydrogen refueling station based on low-temperature and high-pressure graded hydrogen storage. As shown in FIG. 1, the hydrogen refueling station includes a liquid hydrogen storage tank 1, hydrogen storage vessels 6 and a hydrogen dispenser 8, which are sequentially connected. An external liquid hydrogen tank truck transports liquid hydrogen to the hydrogen refueling station and conveys the liquid hydrogen to the liquid hydrogen storage tank 1 configured to convey the liquid hydrogen to the hydrogen storage vessels 6 (in this process, the liquid hydrogen will be changed morphologically, that is, in the related arts, the low-temperature liquid hydrogen is converted into ambient-temperature gaseous hydrogen); the hydrogen storage vessels 6 then convey the gaseous hydrogen to the hydrogen dispenser 8 which is configured to perform gaseous hydrogen refueling operation on an onboard hydrogen storage cylinder. In an embodiment of the present disclosure, three hydrogen storage vessels 6 are disposed, which are a first hydrogen storage vessel 60, a second hydrogen storage vessel 61 and a third hydrogen storage vessel 62. The number of the hydrogen storage vessels 6 can be adjusted based on market demand and the scale of the hydrogen refueling station. In this embodiment, due to graded hydrogen storage of the hydrogen refueling station, at least two hydrogen storage vessels are to be disposed. In some embodiments, an inner vessel of the liquid hydrogen storage tank 1 may be made of a material such as austenitic stainless steel or aluminium alloy or the like and a high-vacuum multi-layer heat insulating material is disposed outside the inner vessel.

The hydrogen storage vessels 6 are communicated with the hydrogen dispenser 8 through a main refueling pipe 9 provided with a refueling controller 7. The main refueling pipe 9 includes a first refueling pipe 91 between the hydrogen storage vessels 6 and the refueling controller 7 and a header pipe 90 between the refueling controller 7 and the hydrogen dispenser 8. In some embodiments, the main refueling pipe 9 may be made of a material such as austenitic stainless steel. The first refueling pipe 91 and the header pipe 90 may be same or different in material. The working principle of the refueling controller 7 is briefly introduced below: an electric control valve is disposed for each hydrogen storage vessel 6 on the first refueling pipe 91 and is electrically connected with the refueling controller 7 and also controlled by the refueling controller 7 to turn on or off. As a result, the refueling controller 7 can control corresponding hydrogen storage vessels 6 by controlling the electric control valves to communicate with the header pipe 90 for participation in refueling operation.

The hydrogen refueling station provided by the embodiments of the present disclosure is improved as follows: the hydrogen storage vessels 6 used herein are low-temperature and high-pressure hydrogen storage vessels 6 and thus, a booster pump and a high-pressure vaporizer are disposed between the liquid hydrogen storage tank 1 and the hydrogen storage vessels 6, where the booster pump is configured to pressurize low-temperature and low-pressure liquid hydrogen output by the liquid hydrogen storage tank 1 into low-temperature and high-pressure liquid hydrogen, and the high-pressure vaporizer is configured to vaporize the low-temperature and high-pressure liquid hydrogen output by the booster pump into low-temperature and high-pressure gaseous hydrogen, adjust a temperature of the low-temperature and high-pressure gaseous hydrogen to a set temperature, and store the low-temperature and high-pressure gaseous hydrogen into the hydrogen storage vessels 6. The booster pump is configured to pressurize the low-temperature and low-pressure liquid hydrogen into the low-temperature and high-pressure liquid hydrogen so as to facilitate subsequent gaseous hydrogen refueling operation (a maximum pressure for refueling the gaseous hydrogen is to be higher than a nominal working pressure of an onboard hydrogen storage cylinder).

The high-pressure vaporizer generally vaporizes low-temperature and high-pressure liquid hydrogen directly into ambient-temperature and high-pressure gaseous hydrogen. But, in the embodiments of the present disclosure, the high-pressure vaporizers converts low-temperature and high-pressure liquid hydrogen into low-temperature and high-pressure gaseous hydrogen. Graded storage is performed on the high-pressure gaseous hydrogen based on temperature value and pressure value such that the high-pressure gaseous hydrogen is in a low-temperature state. In this way, it is no need to convert the low-temperature liquid hydrogen into ambient-temperature gaseous hydrogen but convert the low-temperature liquid hydrogen into low-temperature gaseous hydrogen, greatly reducing the waste of the cold energy. Moreover, in the present disclosure, all of the gaseous hydrogen to be refuelled is the low-temperature gaseous hydrogen converted from the liquid hydrogen rather than the ambient-temperature and high-pressure gaseous hydrogen converted from a part of the liquid hydrogen, which is later pre-cooled by cold energy carried by a part of the liquid hydrogen. Therefore, in the present disclosure, the waste of the cold energy is reduced and hence the use of a cooling circulating unit is reduced, further reducing the costs.

Furthermore, for ease of descriptions, the temperature value and the maximum pressure value of the gaseous hydrogen stored in the hydrogen storage vessels 6 are referred to as $T_n$ and $P_n$. In the embodiments of the present disclosure, three hydrogen storage vessels 6 are disposed and thus n=3. In other words, for the first hydrogen storage vessel 60, the temperature value is $T_1$, the maximum pressure value is $P_1$; for the second hydrogen storage vessel 61, the temperature value is $T_2$ and the maximum pressure value is $P_2$; and for the third hydrogen storage vessel 62, the temperature value is $T_3$ and the maximum pressure value is $P_3$. The graded hydrogen storage of the hydrogen refueling station provided by the embodiments of the present disclosure specifically refers to that $T_1<T_2<T_3$ and $P_1<P_2<P_3$, and the refueling controller 7 is configured to, based on an ascending order of the temperature values, sequentially control corresponding hydrogen storage vessels 6 to communicate with the hydrogen dispenser 8 for participation in refueling operation.

When corresponding hydrogen storage vessels 6 are sequentially controlled based on the ascending order of the temperature values to communicate with the hydrogen dispenser 8 for participation in refueling operation, the low-temperature and high-pressure gaseous hydrogen in the hydrogen storage vessel 6 with the lowest temperature may be used to pre-cool the main refueling pipe 9 and a subsequent pipe such that the low-temperature and high-pressure gaseous hydrogen in other hydrogen storage vessels 6 will no longer lose a large amount of cold energy when flowing through the main refueling pipe 9 subsequently, thereby increasing the control accuracy for the temperature of the refuelled gaseous hydrogen.

As mentioned above, the number of the hydrogen storage vessels can be adaptively adjusted. Thus, in other different implementations, when n=2, $T_1<T_2$, $P_1<P_2$; when n≥3, $T_1< \ldots T_{(n-1)}<T_n$ and $P_1< \ldots P_{(n-1)}<P_n$.

In an embodiment of the present disclosure, two booster pumps are disposed, which are a first booster pump 2 and a second booster pump 3 respectively, and the corresponding high-pressure vaporizers are disposed, which respectively are a first high-pressure vaporizer 4 and a second high-pressure vaporizer 5. The liquid hydrogen storage tank 1 is in communication with the first booster pump 2 and the second booster pump 3 via a pipe on which an electric control valve is disposed. The first booster pump 2 is in communication with the first high-pressure vaporizer 4 via a pipe, and the second booster pump 3 is in communication with the second high-pressure vaporizer 5 via a pipe, where a one-way valve is disposed on the pipes respectively. The first high-pressure vaporizer 4 is in communication with the first hydrogen storage vessel 60 via a pipe, and the second high-pressure vaporizer 5 is in communication with both the second hydrogen storage vessel 61 and the third hydrogen storage vessel 62 via a pipe, where an electric control valve is disposed on the pipes respectively. The first hydrogen storage vessel 60, the second hydrogen storage vessel 61 and the third hydrogen storage vessel 62 are all in communication with the first refueling pipe 91, where corresponding electric control valves are disposed on the first refueling pipe 91 respectively.

When gas is to be filled (replenished) into the first hydrogen storage vessel 60, the corresponding electric control valve is turned on to allow the liquid hydrogen to flow from the liquid hydrogen storage tank 1 through the first booster pump 2 and the first high-pressure vaporizer 4 into the first hydrogen storage vessel 60. When gas is to be filled (replenished) into the second hydrogen storage vessel 61 and the third hydrogen storage vessel 62, the process is similar to the above. Because the maximum pressure values and the temperature values of the hydrogen storage vessels 6 are different, two booster pumps and two high-pressure vaporizers are disposed, and hence the working parameters of the corresponding booster pumps and high-pressure vaporizers are different. Therefore, the first hydrogen storage vessel 60 can independently use the booster pump and the high-pressure vaporizer capable of providing compliant gaseous hydrogen to the first hydrogen storage vessel 60, thereby reducing the costs.

In some embodiments, the design temperature range and the design pressure range of the gaseous hydrogen in the hydrogen storage vessels 6 are as follows: $-60°$ C.$\leq T_1 <-55°$ C., $-55°$ C.$\leq T_2 <-50°$ C., $-50°$ C.$\leq T_3 \leq -45°$ C.; 40 MPa$\leq P_1 <50$ MPa, 60 MPa$\leq P_2 <70$ MPa, 80 MPa$\leq P_3 \leq 95$ MPa. Of course, in other embodiments, the number of the hydrogen storage vessels and the temperature value and the maximum pressure value of each hydrogen storage vessel can be adjusted but its temperature range and the pressure range are generally required to satisfy the following conditions: $-60°\text{C}.\le T_n \le -45°\text{C}$., $40\text{ MPa} \le P_n \le 95\text{ MPa}$. The pressure value range and the upper limit of the temperature value are obtained based on the refueling working parameters of the hydrogen dispenser, and the lower limit of the temperature value is obtained after the inventor carries out multi-angle consideration on "the process of obtaining the low-temperature gaseous hydrogen by converting the liquid hydrogen", "the heat preservation capability of the hydrogen storage vessels", "cost optimization of the low-temperature material of the hydrogen storage tank", "pre-cooling on the main refueling pipe by the low-temperature gaseous hydrogen" or "the refueling working parameter requirements of the hydrogen dispenser" or the like, and performs simulation research. That is, the lower limit of the temperature value is designed as $-60°\text{C}$. to facilitate the operation of obtaining the low-temperature gaseous hydrogen by converting the liquid hydrogen. The hydrogen storage vessels 6 designed in the present disclosure also have the capability to preserve the low-temperature gaseous hydrogen well at the temperature, and the gaseous hydrogen at the temperature value can have good pre-cooling effect on the main refueling pipe 9 and satisfy the refueling working parameter requirement upon arrival at the hydrogen dispenser 8. Moreover, compared with the ambient-temperature hydrogen storage vessels, the manufacturing cost of the low-temperature hydrogen storage vessels will not be increased significantly.

In some embodiments, the design pressure of the first hydrogen storage vessel 60 is between 45 MPa and 50 MPa, and its corresponding design volume is between 5 m³ and 8 m³; the design pressure of the second hydrogen storage vessel 61 and the third hydrogen storage vessel 62 is above 65 MPa and their design volume is between 3 m³ and 5 m³. The low-temperature and high-pressure hydrogen storage vessels 6 in the present disclosure are large vessels which are applied in the hydrogen refueling station and specifically applied to gaseous hydrogen refueling to an onboard hydrogen storage cylinder.

Figure 2:
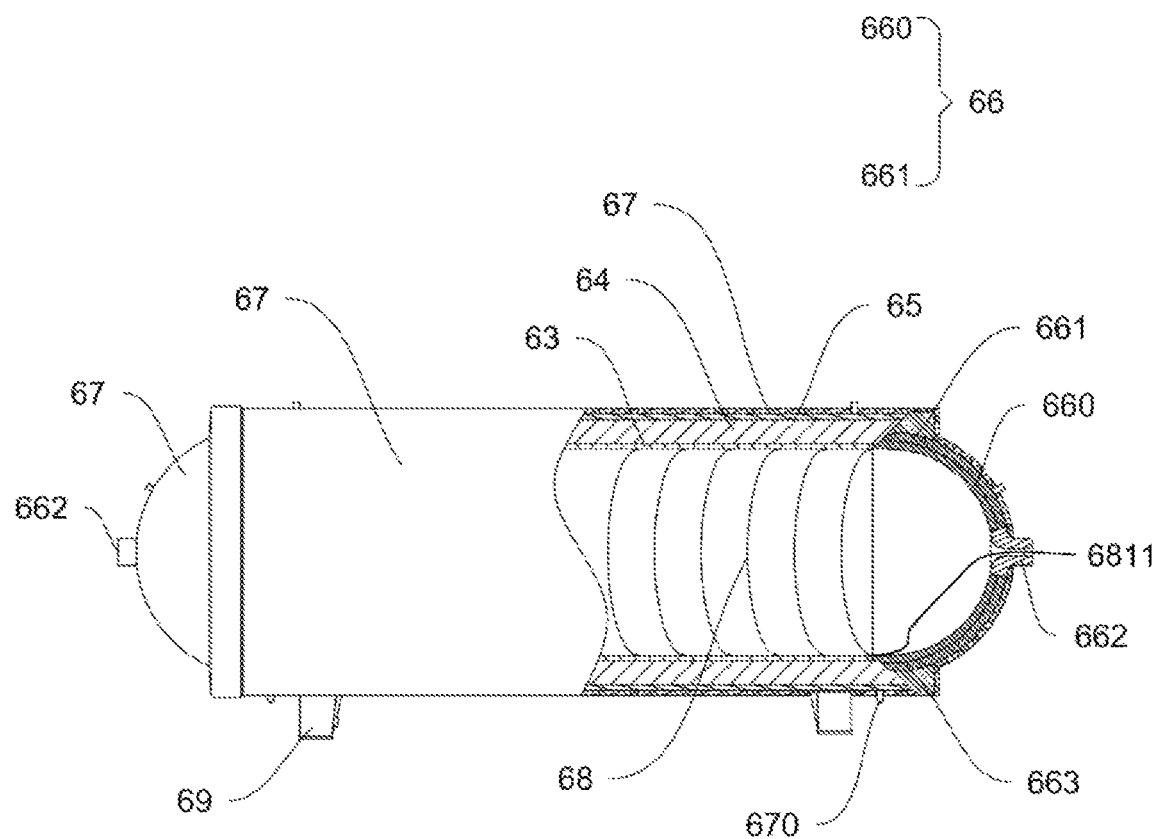
FIG. 2 is a sectional view of a hydrogen storage vessel of the hydrogen refueling station in FIG. 1.

Since the hydrogen storage vessels 6 in the embodiments of the present disclosure are used to store low-temperature and high-pressure gaseous hydrogen, they need to have good pressure resistance and heat preservation effect. Thus, the inventor performs low-temperature designing on the existing hydrogen storage vessels 6. For example, as shown in FIG. 2, in some embodiments, the hydrogen storage vessel 6 include an inner cylinder 63, a ribbon wound layer 64, a protective housing 65, a head 66, a reinforcing hoop 663 and a heat insulating layer 67.

The inner cylinder 63 is made of a composite steel plate formed by an austenitic stainless steel composite and a low-temperature pressure vessel-specific steel substrate; the ribbon wound layer 64 is formed by winding a steel ribbon on an outer surface of the inner cylinder 63 in an interlaced manner; the protective housing 65 is sleeved outside the inner cylinder 63 and the ribbon wound layer 64, where the protective housing 65 is made of a low-temperature pressure vessel-specific steel material. The reinforcing hoop 663 is fixed to the ribbon wound layer 64, for example, by welding. The head 66 includes an inner head 660 and an outer head 661, where the inner head 660 is fixed to an end portion of the ribbon wound layer 64 and the inner cylinder 63, for example, by welding; the outer head 661 is fixed to an end portion of the ribbon wound layer 64 and the reinforcing hoop 663, for example, by welding. The inner head 660 and the inner cylinder 63 are same in material, and the outer head 661 has the same material as the ribbon wound layer 64 and the protective housing 65. The heat insulating layer 67 is disposed outside the protective housing 65 and the head 66. The heat insulating layer 67 may achieve heat insulation by expansion foam or by another heat insulating structure. The reinforcing hoop 663 and the ribbon wound layer 64 may be same in material.

In some embodiments, a sensor interface 670 for mounting any type of sensor is further disposed on the hydrogen storage vessel 6, for example, a hydrogen sensor may be connected with the sensor interface 670 to monitor hydrogen leakage in the ribbon wound layer 64. In some embodiments, a saddle support 69 may be further disposed on the hydrogen storage vessel 6 to facilitate mounting operation. In some embodiments, a head seat 662 is disposed on an end portion of the head 66, where a pipe for the gaseous hydrogen to enter and leave is disposed on the head seat 662.

In an embodiment of the present disclosure, by disposing a three-layer structure including the inner cylinder 63, the ribbon wound layer 64 and the protective housing 65, the hydrogen storage vessel can store a high-pressure gas; the heat insulating layer 67 disposed outside the hydrogen storage vessel enables the hydrogen storage vessel to have good capability against heat exchange so as to maintain a low-temperature state of the gaseous hydrogen in the hydrogen storage vessel.

Figure 3:
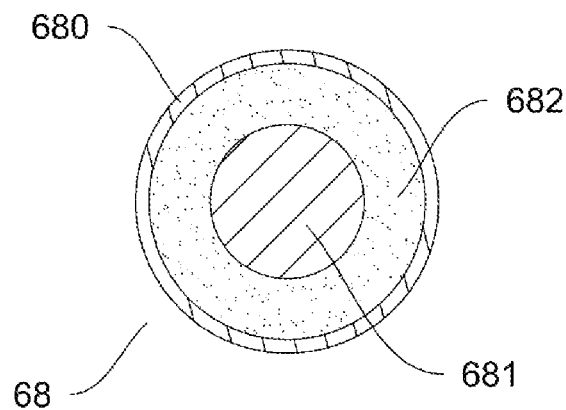
FIG. 3 is a sectional view of an electric heating assembly of the hydrogen refueling station in FIG. 1.

In some embodiments, an electric heating assembly 68 is disposed in the hydrogen storage vessel 6. As shown in FIG. 3, the electric heating assembly 68 includes a heat exchange tube 680 and an electric heating wire 681 disposed inside the heat exchange tube 680. The heat exchange tube 680 is positioned on an inner wall of the inner cylinder 63, and both ends of the electric heating wire 681 are provided with a lead wire 6811 protruding out of the hydrogen storage vessel 6. Both ends of the hydrogen storage vessel 6 are provided with the head 66 respectively. The head seat 662 on the head 66 at one end is provided for the gaseous hydrogen to enter or leave, and the head seat 662 on the head 66 at the other end is provided for the lead wire 6811 to protrude out to connect with an external power source or control line. By disposing the electric heating assembly 68, the temperature control accuracy for the refuelled gaseous hydrogen can be improved. Furthermore, the electric heating assembly 68 is disposed on the inner wall of the inner cylinder 63 to directly contact with the low-temperature gaseous hydrogen, so as to increase the heating efficiency. In some embodiments, the heat exchange tube 680 may be made of copper or austenitic stainless steel. In some embodiments, the electric heating wire 681 may be an iron-chromium-aluminium electric heating wire or nickel-chromium electric heating wire or the like.

In some embodiments, a heat conduction medium 682 is filled between the inner wall of the heat exchange tube 680 and the electric heating wire 681. With the heat conduction medium 682, the heat generated by the electric heating wire 681 can be transferred to the heat exchange tube 680 faster, further improving the heating efficiency of the low-temperature gaseous hydrogen. The heat conduction medium 682 may be a heat conduction oil or a magnesium oxide powder.

The applications of the embodiments of the present disclosure can have the following beneficial effects.

1. Graded storage is performed on the high-pressure gaseous hydrogen based on the temperature value and the pressure value such that the high-pressure gaseous hydrogen is in a low-temperature state. In this case, without converting low-temperature liquid hydrogen into ambient-temperature gaseous hydrogen as in the related arts, the low-temperature liquid hydrogen is converted into low-temperature gaseous hydrogen, significantly reducing the waste of the cold energy. All the gaseous hydrogen to be refuelled in the present disclosure is the low-temperature gaseous hydrogen obtained by pressurizing and vaporizing the liquid hydrogen, without going through the steps of "obtaining ambient-temperature and high-pressure gaseous hydrogen by converting a part of the liquid hydrogen, and then pre-cooling the above ambient-temperature and high-pressure gaseous hydrogen by using cold energy carried by a part of the liquid hydrogen" in the related arts. Therefore, in the present disclosure, the waste of the cold energy is reduced, and thus, the use of the cooling circulating unit is reduced, further reducing the costs.

2. When the corresponding hydrogen storage vessels are sequentially controlled based on the ascending order of the temperature values to communicate with the hydrogen dispenser for participation in refueling operation, the low-temperature and high-pressure gaseous hydrogen in the hydrogen storage vessel with the lowest temperature may be used to pre-cool the main refueling pipe and the subsequent pipe such that the low-temperature and high-pressure gaseous hydrogen in other hydrogen storage vessels will no longer lose a large amount of cold energy when flowing through the main refueling pipe subsequently, thereby increasing the control accuracy for the temperature of the refuelled gaseous hydrogen.

An embodiment of the present disclosure further provides a gaseous hydrogen refueling method. The method is applied to the hydrogen refueling station provided by the above embodiments to refuel gaseous hydrogen into an onboard hydrogen storage cylinder. The method includes the following steps S100 to S300.

At step S100, by using the refueling controller 7, a hydrogen storage vessel 6 storing the gaseous hydrogen with a temperature value $T_1$ and a maximum pressure value $P_1$ is controlled to communicate with the hydrogen dispenser 8, so as to perform pre-cooling on the main refueling pipe 8 and the subsequent pipe and perform refueling.

In this step, the inventor designs the $T_1$ as between −60° C. and −55° C. through simulation research. When the low-temperature and high-pressure gaseous hydrogen at this temperature flows through the main refueling pipe 9 and the subsequent pipe, the low-temperature and high-pressure gaseous hydrogen, on the one hand, pre-cools the main refueling pipe 9 and the subsequent pipe and on the other hand, increases its own temperature to between −40° C. and −35° C., satisfying the requirement of the hydrogen dispenser 8 for the temperature parameter. The subsequent pipe in the embodiments of the present disclosure refers to a pipe inside the hydrogen dispenser and a pipe inside a vehicle to be refuelled with gaseous hydrogen.

At step S200, in response to determining that an internal pressure value of the hydrogen storage vessel 6 storing the gaseous hydrogen with the temperature value $T_1$ and the maximum pressure value $P_1$ drops to be less than a sum of a back pressure of the hydrogen dispenser 8 and a set switching pressure difference, a hydrogen storage vessel 6 storing the gaseous hydrogen with a temperature value $T_2$ and a maximum pressure value $P_2$ is controlled to communicate with the hydrogen dispenser 8, namely, a next hydrogen storage vessel 6 is controlled based on an ascending order of the temperature values to communicate with the hydrogen dispenser 8 for refueling.

At step S300, other hydrogen storage vessels 6 are used as in the step S200 until the refueling is completed or the internal pressure value of all hydrogen storage vessels 6 drops to be less than the sum of the back pressure of the hydrogen dispenser 8 and the set switching pressure difference.

The gaseous hydrogen refueling method provided by the present disclosure has the similar beneficial effects to that of the above hydrogen refueling station and will not be repeated herein.

It should be noted that in the embodiments of the present disclosure, the back pressure of the hydrogen dispenser refers to an actual working pressure of the hydrogen dispenser at work, which is a variable value. For example, when a hydrogen dispenser with a rated working pressure of 70 MPa is used to refuel gaseous hydrogen into an onboard hydrogen storage cylinder of a nominal working pressure of 70 MPa, since the onboard hydrogen storage cylinder can be sent to the hydrogen refueling station for refueling only when the onboard hydrogen storage cylinder is in shortage of gaseous hydrogen, the internal pressure of the onboard hydrogen storage cylinder is surely below the normal working pressure upon the start of refueling. In the early stage of the refueling, the back pressure of the hydrogen dispenser is controlled to be slightly higher than the actual pressure of the onboard hydrogen storage cylinder. For example, when the internal pressure of the onboard hydrogen storage cylinder before refueling is only 5 MPa, the back pressure of the hydrogen dispenser at the start of refueling (the actual working pressure) is substantially from 6 to 7 MPa. Along with the progress of the refueling operation, the internal pressure of the onboard hydrogen storage cylinder increases and the back pressure of the hydrogen dispenser increases accordingly. The working principle of the hydrogen dispenser is to ensure a proper pressure difference between the hydrogen dispenser and the onboard hydrogen storage cylinder, such that the gaseous hydrogen can be refuelled into the onboard hydrogen storage cylinder in a controlled and appropriate flow rate. The switching pressure difference mentioned in the embodiments of the present disclosure may be a value selected from a human-set range, for example, from between 2 MPa and 5 MPa. The purpose of this design is to allow the gaseous hydrogen to flow from the hydrogen storage vessels to the hydrogen dispenser in a controlled and appropriate flow rate, achieving good refueling efficiency.

As mentioned in the above examples, the first hydrogen storage vessel is used for refueling at the start of refueling. It is supposed that the maximum pressure value of the first hydrogen storage vessel is 45 MPa. Along with the progress of the refueling operation, the pressure in the onboard hydrogen storage cylinder gradually increases to 35 MPa. At this time, the back pressure of the hydrogen dispenser will increase to 37 MPa and the internal pressure of the first hydrogen storage vessel drops, for example, to 40 MPa, along with the outflow of the gaseous hydrogen. If the switching pressure difference is set to 3 MPa, the pressure of the first hydrogen storage vessel already drops to a sum of the back pressure of the hydrogen dispenser and the set switching pressure difference. If the refueling operation is continued using the first hydrogen storage vessel, the flow rate of the gaseous hydrogen will decrease and the refueling efficiency will be reduced accordingly. The back pressure of the hydrogen dispenser and the switching pressure difference can be referred to the related arts. Their principle has been described above and will not be repeated herein.

In addition, it can be easily understood from the above examples that, "sequentially controlling the corresponding hydrogen storage vessels based on the ascending order of the temperature values to communicate with the hydrogen dispenser for participation in the refueling operation" mentioned in the embodiments of the present disclosure does not mean that the second hydrogen storage vessel can be used for refueling only when the gaseous hydrogen in the first hydrogen storage vessel is used up but means that each time refueling operation is performed on an onboard hydrogen storage cylinder of a vehicle, the first hydrogen storage vessel is used first for refueling operation until its pressure drops to a level improper for continuing refueling, and then switching is performed to the second hydrogen storage vessel for refueling operation and so on, until the last hydrogen storage vessel with the highest pressure participates in the refueling operation to refuel the gaseous hydrogen into the onboard hydrogen storage cylinder until its internal pressure reaches a target pressure.

In the above step, if the temperature of the low-temperature and high-pressure gaseous hydrogen is too low to satisfy the temperature parameter requirement of the hydrogen dispenser 8, the low-temperature and high-pressure gaseous hydrogen may be heated by using the electric heating assembly 68 inside the hydrogen storage vessel 6 or a high-voltage electric heater 80 provided on the hydrogen dispenser 8, thereby satisfying the requirement. It should be noted that the environmental temperature of geographical locations where most of the hydrogen refueling stations are located will not be below −20° C. in most time. In this case, even if it is required to heat the low-temperature gaseous hydrogen using the electric heating assembly 68 or the high-voltage electric heater 80, the energy consumed is far less than the energy consumed for cooling the ambient-temperature gaseous hydrogen by using a cooling equipment in the related arts.

By applying the hydrogen refueling station provided by the embodiments of the present disclosure, simulation is performed: refueling operation is performed under the condition that the gaseous hydrogenes in three hydrogen storage vessels 6 have different design pressures and design temperatures and by respectively comparing to the solution of using the ambient-temperature and high-pressure hydrogen storage vessels in the related arts (the same number of hydrogen storage vessels, the same volume and the same pressure), the following simulation results are obtained:

Simulation 1: the hydrogen storage temperature of the first hydrogen storage vessel 60 is −60° C. and the maximum working pressure of the first hydrogen storage vessel 60 is 45 MPa; the hydrogen storage temperature of the second hydrogen storage vessel 61 is −55° C. and the maximum working pressure of the second hydrogen storage vessel 61 is 65 MPa; the hydrogen storage temperature of the third hydrogen storage vessel 62 is −50° C. and the maximum working pressure of the third hydrogen storage vessel 62 is 90 MPa; and the volume ratio of the three hydrogen storage vessels 6 is 1:1:1. The State of Charge (SOC) for the onboard hydrogen storage cylinder of 99 L and 70 MPa may reach 91.2% (higher than the SOC 90.5% realized in the solution of using the ambient-temperature and high-pressure hydrogen storage vessels in the prior arts), and the refueling energy consumption of the hydrogen refueling station in the present disclosure (the electric energy consumed to complete the above refueling operation) is only 20% of the refueling energy consumption of the hydrogen refueling station in the prior arts.

Simulation 2: the hydrogen storage temperature of the first hydrogen storage vessel 60 is −55° C. and the maximum working pressure of the first hydrogen storage vessel 60 is 40 MPa; the hydrogen storage temperature of the second hydrogen storage vessel 61 is −50° C. and the maximum working pressure of the second hydrogen storage vessel 61 is 60 MPa; the hydrogen storage temperature of the third hydrogen storage vessel 62 is −45° C. and the maximum working pressure of the third hydrogen storage vessel 62 is 80 MPa; and the volume ratio of the three hydrogen storage vessels 6 is 1:1:1. The State of Charge (SOC) for the onboard hydrogen storage cylinder may reach 91.1% (higher than the SOC 90.5% realized in the solution of using the ambient-temperature and high-pressure hydrogen storage vessels in the prior arts), and the refueling energy consumption of the hydrogen refueling station in the present disclosure (the electric energy consumed to complete the above refueling operation) is only 22% of the refueling energy consumption of the hydrogen refueling station in the prior arts.

Simulation 3: the hydrogen storage temperature of the first hydrogen storage vessel 60 is −58° C. and the maximum working pressure of the first hydrogen storage vessel 60 is 50 MPa; the hydrogen storage temperature of the second hydrogen storage vessel 61 is −52° C. and the maximum working pressure of the second hydrogen storage vessel 61 is 70 MPa; the hydrogen storage temperature of the third hydrogen storage vessel 62 is −46° C. and the maximum working pressure of the third hydrogen storage vessel 62 is 95 MPa; and the volume ratio of the three hydrogen storage vessels 6 is 1:1:1. The State of Charge (SOC) for the onboard hydrogen storage cylinder may reach 91.1% (higher than the SOC 90.5% realized in the solution of using the ambient-temperature and high-pressure hydrogen storage vessels in the prior arts), and the refueling energy consumption of the hydrogen refueling station in the present disclosure (the electric energy consumed to complete the above refueling operation) is only 21% of the refueling energy consumption of the hydrogen refueling station in the prior arts.

Figure 4:
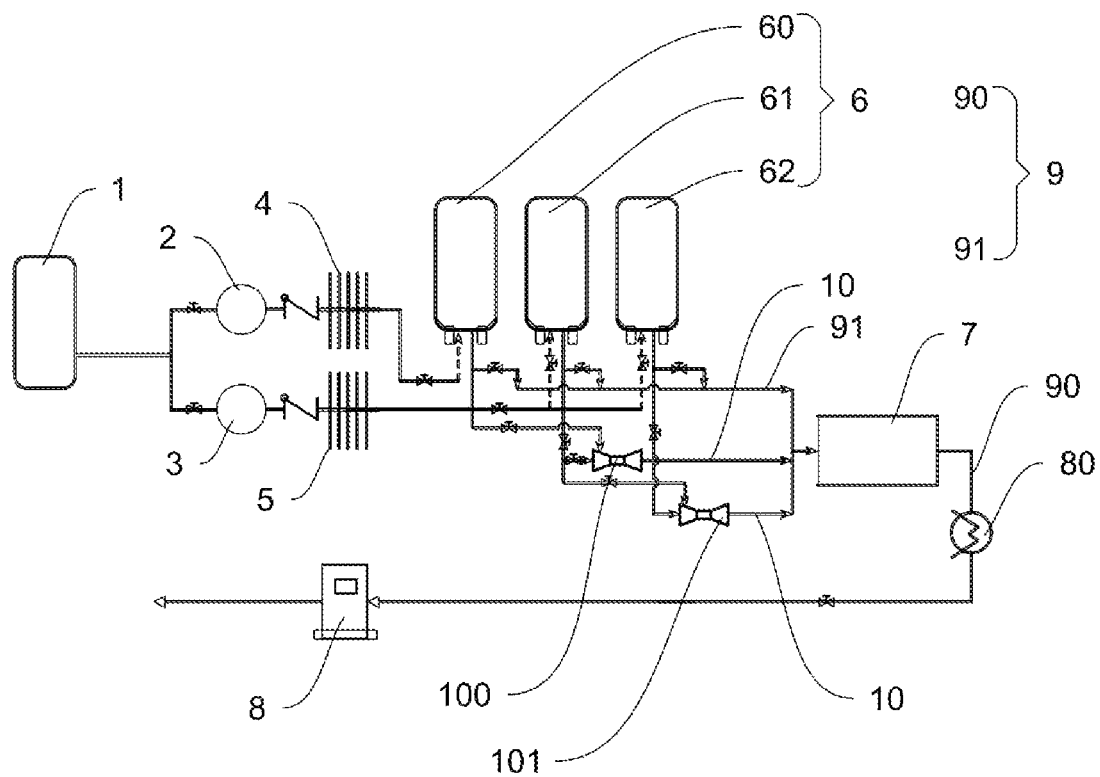
FIG. 4 is a schematic diagram illustrating a hydrogen refueling station based on low-temperature and high-pressure graded hydrogen storage according to another embodiment of the present disclosure.

An embodiment of the present disclosure provides another hydrogen refueling station based on low-temperature and high-pressure graded hydrogen storage. This embodiment differs from the above embodiments in that: as shown in FIG. 4, in this embodiment, a second refueling pipe 10 is disposed between the hydrogen storage vessels 6 and the refueling controller 7 and an ejector is disposed on the second refueling pipe 10. For ease of descriptions, in this embodiment, based on the order of the pressure values of the internally-stored gaseous hydrogen, two hydrogen storage vessels 6 adjacent to each other in sequence are referred to as a first high-pressure tank and a second high-pressure tank respectively, and the pressure value of the gaseous hydrogen in the first high-pressure tank is less than the pressure value of the gaseous hydrogen in the second high-pressure tank. For example, since the pressure values of the gaseous hydrogen stored in the first hydrogen storage vessel 60 and the second hydrogen storage vessel 61 are adjacent to each other in sequence, the first hydrogen storage vessel 60 is the first high-pressure tank and the second hydrogen storage vessel 61 is the second high-pressure tank. Further, since the pressure values of the gaseous hydrogen stored in the second hydrogen storage vessel 61 and the third hydrogen storage vessel 62 are adjacent to each other in sequence, the second hydrogen storage vessel 61 is the first high-pressure tank and the third hydrogen storage vessel 62 is the second high-pressure tank. Therefore, the first high-pressure tank or the second high-pressure tank does not refer to a particular hydrogen storage vessel 6.

In this embodiment, disposing the second refueling pipe 10 between the first high-pressure tank and the second high-pressure tank specifically means that a second refueling pipe 10 is disposed between the first hydrogen storage vessel 60 and the second hydrogen storage vessel 61, and a second refueling pipe 10 is further disposed between the second hydrogen storage vessel 61 and the third hydrogen storage vessel 62. Further, the second refueling pipes 10 are in communication with the refueling controller 7 which is configured to control the hydrogen storage vessels 6 to select the first refueling pipe 91 or the second refueling pipe 10 to communicate with the header pipe 90. An ejector is disposed on the second refueling pipe 10 (a first ejector 100 between the first hydrogen storage vessel 60 and the second hydrogen storage vessel 61, and a second ejector 101 between the second hydrogen storage vessel 61 and the third hydrogen storage vessel 62). The ejector includes an ejection fluid inlet in communication with the first high-pressure tank, a working fluid inlet in communication with the second high-pressure tank, and an ejection mouth in communication with the refueling controller 7, such that the gaseous hydrogen output by the second high-pressure tank drives the gaseous hydrogen output by the first high-pressure tank so as to be ejected together out of the ejection mouth.

In the above solution, the high-pressure gaseous hydrogen in the second high-pressure tank may be used to drive the high-pressure gaseous hydrogen in the first high-pressure tank by the ejector to flow together toward the hydrogen dispenser 8, such that the gaseous hydrogen in the first high-pressure tank can be fully used. In this case, when the hydrogen storage vessels 6 are to be replenished with gaseous hydrogen after being used up, since the energy consumed for the booster pump to replenish gaseous hydrogen to the first high-pressure tank is relatively less, the entire energy consumption of the hydrogen refueling station can be reduced while the gaseous hydrogen in the first high-pressure tank can be fully used.

It should be noted that the ejector is an existing device which can be directly purchased from market. When the gaseous hydrogen in the second high-pressure tank drives the gaseous hydrogen in the first high-pressure tank by the ejector to flow out together, the gaseous hydrogen use rate of the first high-pressure tank can be increased and the energy consumption for the booster pump to replenish gaseous hydrogen can be reduced.

An embodiment of the present disclosure further provides a hydrogen refueling method. The method is applied to the hydrogen refueling station provided by the above embodiments to refuel gaseous hydrogen into an onboard hydrogen storage cylinder. The method includes steps S400 to S700.

At step S400, by using the refueling controller 7, a hydrogen storage vessel 6 storing the gaseous hydrogen with a temperature value $T_1$ and a maximum pressure value $P_1$ is controlled to select the first refueling pipe 91 to communicate with the header pipe 90 for refueling, so as to perform pre-cooling on the main refueling pipe 9 and a subsequent pipe.

At step S500, in response to determining that the internal pressure value of the hydrogen storage vessel 6 storing the gaseous hydrogen with the temperature value $T_1$ and the maximum pressure value $P_1$ drops to a sum of a back pressure of the hydrogen dispenser 8 and a set switching pressure difference (along with the progress of the refueling operation, the gaseous hydrogen in the hydrogen storage vessel 6 decreases and the pressure therein also decreases accordingly), the hydrogen storage vessel 6 storing the gaseous hydrogen with the temperature value $T_1$ and the maximum pressure value $P_1$ and a hydrogen storage vessel 6 storing the gaseous hydrogen with a temperature value $T_2$ and a maximum pressure value $P_2$ are controlled by the refueling controller 7 to select the second refueling pipe 10 to communicate with the header pipe 90 for refueling, so as to increase the gaseous hydrogen use rate of the hydrogen storage vessel 6 storing the gaseous hydrogen with the temperature value $T_1$ and the maximum pressure value $P_1$.

At step S600, in response to determining that a pressure value of the ejection mouth is less than the sum of the back pressure of the hydrogen dispenser 8 and the set switching pressure difference, the hydrogen storage vessel 6 storing the gaseous hydrogen with the temperature value $T_2$ and the maximum pressure value $P_2$ is controlled to select the first refueling pipe 91 to communicate with the header pipe 90 for refueling.

At step S700, other hydrogen storage vessels 6 are used as in the steps S500 and S600 until the refueling is completed or the internal pressure value of all hydrogen storage vessels 6 drops to be less than the sum of the back pressure of the hydrogen dispenser 8 and the set switching pressure difference.

The gaseous hydrogen refueling method provided by the present disclosure has the similar beneficial effects to that of the above hydrogen refueling station and will not be repeated herein.

Simulation is performed by applying the hydrogen refueling station provided by the embodiments of the present disclosure. Under the same simulation condition as in the simulations 1, 2 and 3 as mentioned in the above embodiments, the gaseous hydrogen use rate of the first hydrogen storage vessel 60 is increased by about 5.2%, and the gaseous hydrogen use rate of the second hydrogen storage vessel 61 is increased by about 4.9%. Thus, the entire energy consumption of the hydrogen refueling station is further reduced by about 4.8%.

The above are only the specific embodiments of the present disclosure, but the scope of protection of the present disclosure is not limited hereto. Those skilled in the arts should understand that the present disclosure includes but not limited to the contents described by referring the drawings and the specific embodiments, and any modifications made without departing from the functional and structural principle of the present disclosure shall be encompassed in the scope of protection of the claims.

The invention claimed is:

1. A hydrogen refueling station based on low-temperature and high-pressure graded hydrogen storage, comprising:
   a liquid hydrogen storage tank;
   hydrogen storage vessels, wherein a number of the hydrogen storage vessels is n, n≥2, and the hydrogen storage vessels are low-temperature and high-pressure hydrogen storage vessels;
   a booster pump and a high-pressure vaporizer, disposed between the liquid hydrogen storage tank and the hydrogen storage vessels, wherein,
      the booster pump is configured to pressurize low-temperature and low-pressure liquid hydrogen output by the liquid hydrogen storage tank into low-temperature and high-pressure liquid hydrogen, and
      the high-pressure vaporizer is configured to vaporize the low-temperature and high-pressure liquid hydrogen output by the booster pump into low-temperature and high-pressure gaseous hydrogen, adjust a temperature of the low-temperature and high-pressure gaseous hydrogen to a set temperature, and store the low-temperature and high-pressure gaseous hydrogen into the hydrogen storage vessels;

wherein a temperature value and a maximum pressure value of the low-temperature and high-pressure gaseous hydrogen stored in the hydrogen storage vessels are $T_n$ and $P_n$; when n=2, $T_1<T_2$, $P_1<P_2$; when n≥3, $T_1< \ldots T_{(n-1)}<T_n$ and $P_1< \ldots P_{(n-1)}<P_n$;

a hydrogen dispenser, and a main refueling pipe, configured to communicate the hydrogen storage vessels with the hydrogen dispenser and provided with a refueling controller; wherein the refueling controller is configured to, based on an ascending order of the temperature values, sequentially control corresponding hydrogen storage vessels to communicate with the hydrogen dispenser for participation in a refueling operation.

2. The hydrogen refueling station of claim 1, wherein −60° C.≤$T_n$≤−45° C., and 40 MPa≤$P_n$≤95 MPa.

3. The hydrogen refueling station of claim 2, wherein n=3, −60° C.≤$T_1$<−55° C., −55° C.≤$T_2$<−50° C., −50° C.≤$T_3$≤−45° C.; and 40 MPa≤$P_1$<50 MPa, 60 MPa≤$P_2$<70 MPa, 80 MPa≤$P_3$≤95 MPa.

4. The hydrogen refueling station of claim 2, wherein when a design pressure of a hydrogen storage vessel is 45 MPa to 50 MPa, a design volume of the hydrogen storage vessel is between 5 $m^3$ and 8 $m^3$.

5. The hydrogen refueling station of claim 4, wherein when the design pressure of the hydrogen storage vessel is above 65 MPa, the design volume of the hydrogen storage vessel is between 3 $m^3$ and 5 $m^3$.

6. The hydrogen refueling station of claim 1, wherein one of the hydrogen storage vessels comprises:

an inner cylinder; and a ribbon wound layer, formed by winding a steel ribbon on an outer surface of the inner cylinder in an interlaced manner.

7. The hydrogen refueling station of claim 6, wherein the hydrogen storage vessel further comprises:

a protective housing, sleeved outside the inner cylinder and the ribbon wound layer; and a reinforcing hoop, fixed to the ribbon wound layer.

8. The hydrogen refueling station of claim 7, wherein the hydrogen storage vessel further comprises a head, wherein the head comprises:

an inner head, fixed to an end portion of the ribbon wound layer and the inner cylinder; and an outer head, fixed to an end portion of the ribbon wound layer and the reinforcing hoop.

9. The hydrogen refueling station of claim 8, wherein the hydrogen storage vessel further comprises a heat insulating layer disposed outside the protective housing and the head.

10. The hydrogen refueling station of claim 9, wherein the hydrogen storage vessel is internally provided with an electric heating assembly, and the electric heating assembly comprises a heat exchange tube and an electric heating wire disposed inside the heat exchange tube.

11. The hydrogen refueling station of claim 10, wherein the heat exchange tube is positioned on an inner wall of the inner cylinder, and both ends of the electric heating wire are provided with a lead wire protruding out of the hydrogen storage vessel.

12. The hydrogen refueling station of claim 11, wherein a heat conduction medium is filled between an inner wall of the heat exchange tube and the electric heating wire.

13. The hydrogen refueling station of claim 1, wherein, based on an order of pressure values of the low-temperature and high-pressure gaseous hydrogen stored internally, two of the hydrogen storage vessels adjacent to each other in sequence are a first high-pressure tank and a second high-pressure tank, and a pressure value of the low-temperature and high-pressure gaseous hydrogen stored in the first high-pressure tank is less than a pressure value of the low-temperature and high-pressure gaseous hydrogen stored in the second high-pressure tank.

14. The hydrogen refueling station of claim 13, wherein the main refueling pipe comprises:

a first refueling pipe, located between the hydrogen storage vessels and the refueling controller; and a header pipe, located between the refueling controller and the hydrogen dispenser.

15. The hydrogen refueling station of claim 14, wherein, a second refueling pipe is disposed between the first high-pressure tank and the second high-pressure tank, and is in communication with the refueling controller; and the refueling controller is configured to control the hydrogen storage vessels to select the first refueling pipe or the second refueling pipe to communicate with the header pipe.

16. The hydrogen refueling station of claim 15, wherein the second refueling pipe is provided with an ejector, the ejector comprises an ejection fluid inlet in communication with the first high-pressure tank, a working fluid inlet in communication with the second high-pressure tank, and an ejection mouth in communication with the refueling controller, such that the low-temperature and high-pressure gaseous hydrogen output by the second high-pressure tank drives the low-temperature and high-pressure gaseous hydrogen output by the first high-pressure tank so as to be ejected together out of the ejection mouth.

17. The hydrogen refueling station of claim 1, wherein the hydrogen dispenser is provided with a high-voltage electric heater configured to heat the low-temperature and high-pressure gaseous hydrogen flowing into the hydrogen dispenser.

18. A gaseous hydrogen refueling method, applied to the hydrogen refueling station of claim 1 to refuel gaseous hydrogen into an onboard hydrogen storage cylinder, wherein the gaseous hydrogen refueling method comprises following steps:

at step S100, by using the refueling controller, controlling a hydrogen storage vessel storing the gaseous hydrogen with the temperature value $T_1$ and the maximum pressure value $P_1$ to communicate with the hydrogen dispenser to perform pre-cooling on the main refueling pipe and a subsequent pipe and perform refueling;

at step S200, in response to determining that an internal pressure value of the hydrogen storage vessel storing the gaseous hydrogen with the temperature value $T_1$ and the maximum pressure value $P_1$ drops to be less than a sum of a back pressure of the hydrogen dispenser and a set switching pressure difference, controlling a next hydrogen storage vessel based on the ascending order of the temperature values to communicate with the hydrogen dispenser for refueling; and at step S300, using other hydrogen storage vessels as in the step S200 until the refueling is completed or the internal pressure value of all hydrogen storage vessels drops to be less than the sum of the back pressure of the hydrogen dispenser and the set switching pressure difference.

19. A gaseous hydrogen refueling method, applied to the hydrogen refueling station of claim 16 to perform hydrogen refueling on an onboard hydrogen storage cylinder, wherein the gaseous hydrogen refueling method comprises following steps:

at step S400, by using the refueling controller, controlling a hydrogen storage vessel storing the gaseous hydrogen with the temperature value $T_1$ and the maximum pressure value $P_1$ to select the first refueling pipe to communicate with the header pipe for refueling, so as to perform pre-cooling on the main refueling pipe and a subsequent pipe and perform refueling;

at step S500, in response to determining that an internal pressure value of the hydrogen storage vessel storing the gaseous hydrogen with the temperature value $T_1$ and the maximum pressure value $P_1$ drops to be less than a sum of a back pressure of the hydrogen dispenser and a set switching pressure difference, controlling, by using the refueling controller, the hydrogen storage vessel storing the gaseous hydrogen with the temperature value $T_1$ and the maximum pressure value $P_1$ and a hydrogen storage vessel storing the gaseous hydrogen with the temperature value $T_2$ and the maximum pressure value $P_2$ to select the second refueling pipe to communicate with the header pipe for refueling, so as to increase a gaseous hydrogen use rate of the hydrogen storage vessel storing the gaseous hydrogen with the temperature value $T_1$ and the maximum pressure value $P_1$;

at step S600, in response to determining that a pressure value of the ejection mouth is less than the sum of the back pressure of the hydrogen dispenser and the set switching pressure difference, controlling, by the refueling controller, the hydrogen storage vessel storing the gaseous hydrogen with the temperature value $T_2$ and the maximum pressure value $P_2$ to select the first refueling pipe to communicate with the header pipe for refueling; and at step S700, using other hydrogen storage vessels as in the steps S500 and S600 until the refueling is completed or the internal pressure value of all hydrogen storage vessels drops to be less than the sum of the back pressure of the hydrogen dispenser and the set switching pressure difference.

* * * * *